United States Patent
Liu et al.

(10) Patent No.: US 11,751,081 B2
(45) Date of Patent: *Sep. 5, 2023

(54) LOAD INFORMATION INTERACTION METHOD AND DEVICE, PROCESSOR AND STORAGE MEDIUM

(71) Applicant: ZTE CORPORATION, Guangdong (CN)

(72) Inventors: Yang Liu, Shenzhen (CN); Zhuang Liu, Shenzhen (CN); Jiren Han, Shenzhen (CN); Yin Gao, Shenzhen (CN); He Huang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/883,365

(22) Filed: Aug. 8, 2022

(65) Prior Publication Data

US 2022/0394523 A1 Dec. 8, 2022

Related U.S. Application Data

(63) Continuation of application No. 16/825,980, filed on Mar. 20, 2020, now Pat. No. 11,412,398, which is a
(Continued)

(30) Foreign Application Priority Data

Sep. 27, 2017 (CN) .......................... 201710891695.0

(51) Int. Cl.
*H04W 24/08* (2009.01)
*H04W 28/088* (2023.01)
*H04W 24/10* (2009.01)

(52) U.S. Cl.
CPC ....... *H04W 24/08* (2013.01); *H04W 28/0842* (2020.05); *H04W 24/10* (2013.01)

(58) Field of Classification Search
None
See application file for complete search history.

(56) References Cited

U.S. PATENT DOCUMENTS

| 11,412,398 B2 * | 8/2022 | Liu ................... H04W 28/0284 |
| 2008/0205339 A1 | 8/2008 | Brophy |

(Continued)

FOREIGN PATENT DOCUMENTS

| CN | 101765153 A | 6/2010 |
| CN | 101959241 A | 1/2011 |

(Continued)

OTHER PUBLICATIONS

Catt, "Stage 2 TP for L2 measurements support in case of CU/DU split" 3GPP TSG-RAN WG3 Meeting #96, R3-171462, May 19, 2017, Hangzhou, China (3 pages).

(Continued)

*Primary Examiner* — Saad Khawar
(74) *Attorney, Agent, or Firm* — Foley & Lardner LLP

(57) ABSTRACT

Provided are a method and a device for load information interaction, a processor and a storage medium. The method includes: sending, by a first network node, a load request message to a second network node, where the load request message is used for indicating configuration information used by the second network node in reporting load information to the first network node; and receiving, by the first network node, the load information reported by the second network node according to the configuration information. The second network node and the first network node belong to different logical nodes in a network. The technical problem that load management cannot be performed when the second network node and the first network node belong to different logical nodes in related technology is solved, and the maximum performance of the network is fully exhibited.

16 Claims, 3 Drawing Sheets

Related U.S. Application Data continuation of application No. PCT/CN2018/103913, filed on Sep. 4, 2018.

(56) References Cited

U.S. PATENT DOCUMENTS

| | | | |
|---|---|---|---|
| 2013/0072212 A1* | 3/2013 | Nakamura | H04W 16/08 455/452.1 |
| 2013/0095842 A1 | 4/2013 | Jia et al. | |
| 2013/0210447 A1* | 8/2013 | Moe | H04W 28/16 455/453 |
| 2017/0164235 A1* | 6/2017 | Gao | H04W 36/22 |
| 2021/0289405 A1* | 9/2021 | Tamura | H04W 36/08 |

FOREIGN PATENT DOCUMENTS

| | | |
|---|---|---|
| CN | 102740362 A | 10/2012 |
| CN | 104955128 A | 9/2015 |
| CN | 105516312 A | 4/2016 |
| WO | WO-2013/015255 A1 | 1/2013 |

OTHER PUBLICATIONS

Catt: "Stage 3 TP for L2 measurements support in case of CU/DU split" 3GPP TSG RAN WG3 #96; R3-171463; May 19, 2017; Hangzhou, China (22 pages).
Extended European Search Report for EP Appl. No. 18860907.7, dated May 17, 2021 (11 pages).
First Examination Report on AU 2018340981 dated Feb. 15, 2021 (6 pages).
First Office Action for JP Appl. No. 2020-517326, dated Jun. 23, 2021 (with English translation, 9 pages).
Foreign Action other than Search Report on CN Appl. No. 201710891695.0, dated May 7, 2021 (with English translation, 17 pages).
International Search Report and Written Opinion of the International Searching Authority for PCT/CN2018/103913 dated Nov. 28, 2018 (8 pages).
NEC: "TS 38.401 v0.3.0 covering agreements of RAN3 #97" 3GPP TSG RAN WG3 #97; R3-173449; Aug. 25, 2017; Berlin, Germany (10 pages).
Nokia et al.: "TP of gNB-DU Measurement Reporting (TS 38.473)" 3GPP TSG RAN WG3 AdHoc NR; R31-172317; Jun. 29, 2017; Qingdao, China (4 pages).
Non-Final Office Action on U.S. Appl. No. 16/825,980 dated Oct. 6, 2021.
Notice of Allowance on U.S. Appl. No. 16/825,980 dated Apr. 20, 2022.
Second Examination Report for AU Appl. No. 2018340981, dated Jul. 1, 2021 (5 pages).
U.S. Office Action on U.S. Appl. No. 16/825,980 dated Jan. 14, 2022.
ZTE: "The proposed Stage 2 TP for CU-DU interface" 3GPP TSG RAN WG3 Meeting #95bis; R3-171017; Apr. 7, 2017; Spokane, USA (6 pages).

* cited by examiner

LOAD INFORMATION INTERACTION METHOD AND DEVICE, PROCESSOR AND STORAGE MEDIUM

CROSS-REFERENCES TO RELATED APPLICATIONS

The present application claims the benefit of priority under 35 U.S.C. § 120 as a continuation of U.S. patent application Ser. No. 16/825,980, filed Mar. 20, 2020, which claims the benefit of priority under 35 U.S.C. § 120 as a continuation of PCT Patent Application No. PCT/CN2018/103913, filed on Sep. 4, 2018, which claims priority to Chinese Patent Application No. 201710891695.0, filed on Sep. 27, 2017, the entire content of each of which is incorporated herein by reference.

TECHNICAL FIELD

The present disclosure relates to but is not limited to the field of communications and, in particular, to a method and a device for load information interaction, a processor and a storage medium.

BACKGROUND

As it enters the era of the fifth generation (5G) mobile communication, massive connections and user's requirements on higher data transmission rate pose a great challenge to a transmission capacity of a common public radio interface (CPRI) between a remote radio unit (RRU) and a baseband unit (BBU) in the Long Term Evolution (LTE) system. Since the CPRI is used for transmitting in-phase quadrature (IQ) signals subjected to physical layer coding and modulation and the like, which correspond to a massive digital bit stream rate, the CPRI has relatively high requirements on bandwidth and transmission delay. When an air interface rate of 5G has increased to tens of Gbps, transmission traffic of the CPRI interface may necessarily raise up to at least a Tbps level, which pose tremendous pressure on deployment costs and difficulties of fronthaul network interfaces.

Therefore, in a 5G new radio (NR) system, the manner to classify fronthaul network interfaces needs to be redefined. For the manner to classify fronthaul interfaces, various aspects such as transmission capacity, the transmission delay and deployment convenience need to be considered. For example, considering non-ideal fronthaul transmission, delay-insensitive network functions are implemented in a first network element such as a centralized unit (CU), delay-sensitive network functions are implemented in a second network element such as a distributed unit (DU). The transmission between the first network element and the second network element is performed through an ideal or non-ideal fronthaul network. FIG. 1 is a schematic diagram of an interface between a first network element and a second network element in related technology. However, in the related technology, only the interaction when the control plane (CP) and the user plane (UP) in the first network element are not physically separated is considered.

SUMMARY

In view of this, embodiments of the present disclosure are expected to provide a method and a device for load information interaction, a processor and a storage medium, when a second network node and a first network node belong to different logical nodes in a network, load management is able to be effectively performed.

An embodiment of the present disclosure provides a method for load information interaction. The method includes: sending, by a first network node, a load request message to a second network node, where the load request message is used for indicating configuration information used by the second network node in reporting load information to the first network node; receiving, by the first network node, the load information reported by the second network node according to the configuration information; where the second network node and the first network node belong to different logical nodes in a network.

An embodiment of the present disclosure further provides a method for load information interaction. The method includes: receiving, by a second network node, a load request message from a first network node, where the load request message is used for indicating configuration information used by the second network node in reporting load information to the first network node; receiving, by the second network node, reported load information to the first network node according to the configuration information; where the second network node and the first network node belong to different logical nodes in a network.

An embodiment of the present disclosure further provides a device for load information interaction, applied to a first network node. The device includes: a sending module, which is configured to send a load request message to a second network node, where the load request message is used for indicating configuration information used by the second network node in reporting load information to the first network node; a receiving module, which is configured to receive the load information reported by the second network node according to the configuration information; where the second network node and the first network node belong to different logical nodes in a network.

An embodiment of the present disclosure further provides a device for load information interaction device, applied to a second network node. The device includes: a receiving module, which is configured to receive a load request message sent by a first network node, wherein the load request message is used for indicating configuration information used by the second network node in reporting load information to the first network node; a reporting module, which is configured to report the load information to the first network node according to the configuration information; where the second network node and the first network node belong to different logical nodes in a network.

An embodiment of the present invention further provides a storage medium. The storage medium which is configured to store program codes for executing: sending a load request message to a second network node, where the load request message is used for indicating configuration information used by the second network node in reporting load information to the first network node; receiving the load information reported by the second network node according to the configuration information.

An embodiment of the present disclosure further provides a storage medium. The storage medium which is configured to store program codes for executing: receiving a load request message sent by a first network node, where the load request message is used for indicating configuration information used by the second network node in reporting load information to the first network node; receiving, by the second network node, reported load information to the first network node according to the configuration information.

An embodiment of the present disclosure further provides a processor. The processor is configured to execute programs, when executed, the programs cause the method for load information interaction provided by the embodiments of the present disclosure to be performed.

An embodiment of the present disclosure further provides a device for load information interaction, including: a memory, which is configured to store programs for tunnel grant information processing; and a processor, which is configured to execute the programs, where the programs, when executed, perform the method for load information interaction according to the embodiment of the present disclosure.

With the embodiments of the present disclosure, the first network node sends the load request message to the second network node and receives the load information reported by the second network node, so that the technical problem that load management cannot be performed when the second network node and the first network node belong to different logical nodes in the related technology is solved, and the maximum performance of the network is full exhibited.

DETAILED DESCRIPTION

The present disclosure will be described hereinafter in detail with reference to the drawings and in conjunction with embodiments. It is to be noted that if not in collision, the embodiments and features therein in the present application can be combined with each other.

It is to be noted that the terms "first", "second" and the like in the description, claims and above drawings of the present invention are used to distinguish between similar objects and are not necessarily used to describe a particular order or sequence.

Network architecture according to embodiments of the present disclosure includes: a control plane and a user plane, where the control plane interacts with the user plane.

Figure 1:
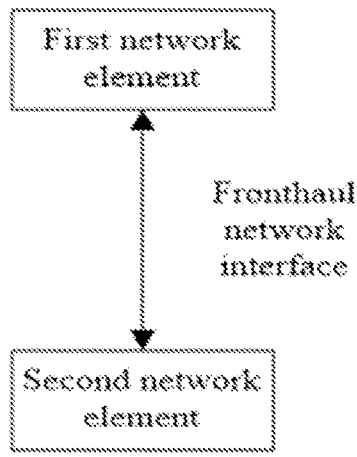
FIG. 1 is a schematic diagram of an interface between a first network element and a second network element in related technology.
Figure 2:
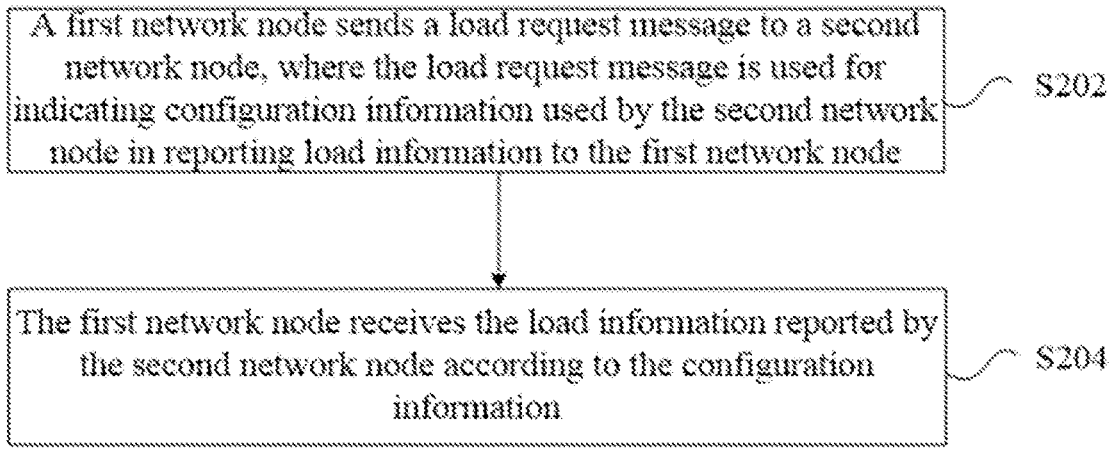
FIG. 2 is a flowchart of a method for load information interaction provided by an embodiment of the present disclosure.

An embodiment provides a method for load information interaction executed on the network architecture described above. FIG. 2 is a flowchart of a method for load information interaction according to an embodiment of the present disclosure. As shown in FIG. 2, the method includes the steps described below.

In step S202, a first network node sends a load request message to a second network node, where the load request message is used for indicating configuration information used by the second network node in reporting load information to the first network node.

In step S204, the first network node receives the load information reported by the second network node according to the configuration information.

The second network node and the first network node belong to different logical nodes in a network.

Through the above steps, the first network node sends the load request message to the second network node and receives the load information reported by the second network node, so that the technical problem in the related technology that load management cannot be performed when the second network node and the first network node belong to different logical nodes is solved, and the maximum performance of the network is fully exhibited.

In an embodiment, the execution body of the above steps, i.e., the first network element may be, but is not limited to, e.g., a control plane network element.

In an embodiment, after sending, by the first network node, the load request message to the second network node, the method further includes one of: receiving, by the first network node, a load request response message fed back by the second network node in response to the load request message, where the load request response message is used for indicating that configuration information initialization is completed; or receiving, by the first network node, a load request failure message fed back by the second network node in response to the load request message, where the load request failure message is used for indicating that configuration information initialization fails.

In an embodiment, the load request response message carries one or more of the following information: identification information of the first network node, identification information of the second network node, a measurement ID, a measurement object list supported by the second network node, and a measurement object list not supported by the second network node. The load request failure message carries one or more of the following information: identification information of the first network node, identification information of the second network node, a measurement ID, and a cause value for initialization failure.

In an embodiment, after the first network node receives the load information reported by the second network node according to the configuration information, the method further includes at least one of: selecting, by the first network node, the second network node for an accessing user equipment (UE) according to the load information; or performing, by the first network node, a load balancing processing on connected second network nodes according to the load information.

In an embodiment, the load request message carries at least one of the following information: identification information of the first network node, identification information of the second network node, indication information for indicating a manner for reporting the load information by the second network node, granularity information of the load information that the second network node is requested to report, or a load object of the load information that the second network node is requested to report.

In an embodiment, the indication information includes one of: periodic reporting, event-triggered reporting, and real-time reporting.

In an embodiment, the granularity information includes one of: node-level, cell-level, UE-level.

In an embodiment, the load object includes at least one of: a hardware resource load status of the second network node, a NG-U interface transmission bandwidth occupation percentage, an F1-U interface transmission bandwidth occupation percentage, resource usage information corresponding to respective slices of a cell, a number of data resource bearers (DRBs) of a terminal which are currently established by the second network node, a number of active users of the second network node, or user traffic information.

In an embodiment, the first network node may be a network node in which the control plane is located, the second network node may be a network node in which the user plane is located, and the control plane and the user plane may be the control plane and the user plane of the same network element or the control plane and the user plane of the same system, or the control plane and the user plane of different objects.

Figure 3:
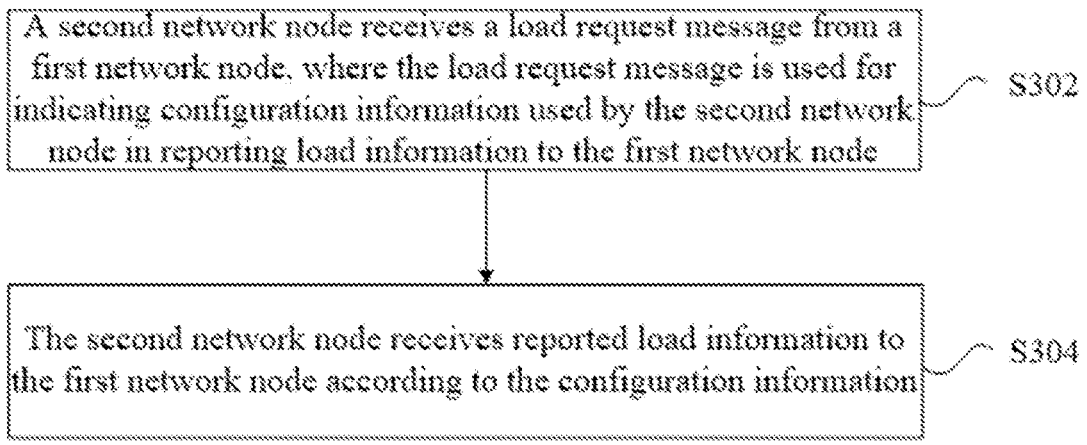
FIG. 3 is a flowchart of another method for load information interaction provided by an embodiment of the present disclosure.

An embodiment provides another method for load information interaction. FIG. 3 is a flowchart of another method for load information interaction provided by an embodiment of the present disclosure. As shown in FIG. 3, the method includes the steps described below.

In step S302, a second network node receives a load request message from a first network node, where the load request message is used for indicating configuration information used by the second network node in reporting load information to the first network node.

In step S304: the second network node receives reported load information to the first network node according to the configuration information.

The second network node and the first network node belong to different logical nodes in a network.

In an embodiment, the execution body of the above steps may be, but is not limited to, e.g., a user plane network element.

In an embodiment, after the second network node receives the load request message sent by the first network node, the method further includes one of: feeding back, by the second network node, a load request response message to the first network node, where the load request response message is used for indicating that the configuration information initialization is completed; or feeding back, by the second network node, a load request failure message to the first network node, where the load request failure message is used for indicating that the configuration information initialization fails.

In an embodiment, the load request message carries at least one of the following information: identification information of the first network node, identification information of the second network node, a measurement ID, indication information for indicating a manner for reporting the load information by the second network node, granularity information of the load information that the second network node is requested to report, or a load object of the load information that the second network node is requested to report.

In an embodiment, the first network node may be a network node in which the control plane is located, the second network node may be a network node in which the user plane is located, and the control plane and the user plane may be the control plane and the user plane of the same network element or the control plane and the user plane of the same system, or the control plane and the user plane of different objects.

From the description of the above-mentioned embodiments, it will be apparent to those skilled in the art that the method in the embodiments described above may be implemented by software plus a necessary general hardware platform, or may of course be implemented by hardware. However, in many cases, the former is a preferred implementation manner. Based on this understanding, the technical solution of the present disclosure substantially, or the part contributing to the existing art, may be embodied in the form of a software product. The computer software product is stored in a storage medium (such as a read-only memory (ROM)/random access memory (RAM), a magnetic disk or an optical disk) and includes one or more instructions for enabling a terminal device (which may be a mobile phone, a computer, a server, a network device or the like) to execute the method according to each embodiment of the present disclosure.

An embodiment of the present disclosure further provides a device for load information interaction. The device is configured to implement the above-mentioned embodiments and preferred implementations. What has been described will not be repeated. As used below, the term "module" may be software, hardware or a combination thereof capable of implementing predetermined function. The device in the embodiment described below is preferably implemented by software, but implementation by hardware or by a combination of software and hardware is also possible and conceived.

Figure 4:
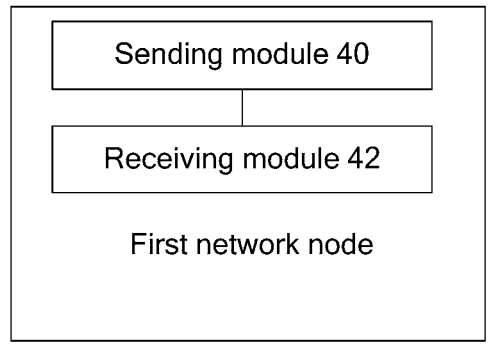
FIG. 4 is a structural block diagram of a device for load information interaction provided by an embodiment of the present disclosure.

FIG. 4 is a block diagram of a device for load information interaction according to an embodiment of the present disclosure. The device is applied to a first network node, as shown in FIG. 4, the device includes: a sending module 40, which is configured to send a load request message to a second network node, where the load request message is used for indicating configuration information used by the second network node in reporting load information to the first network node; and a receiving module 42, which is configured to receive the load information reported by the second network node according to the configuration information.

The second network node and the first network node belong to different logical nodes in a network.

Figure 5:
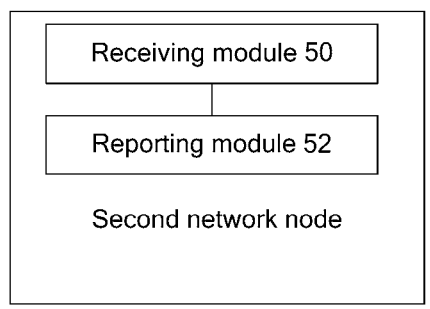
FIG. 5 is a structural block diagram of another device for load information interaction provided by an embodiment of the present disclosure.

FIG. 5 is a block diagram of another device for load information interaction according to an embodiment of the present disclosure. The device is applied to a second network node, as shown in FIG. 5, the device includes: a receiving module 50, which is configured to receive a load request message sent by a first network node, where the load request message is used for indicating configuration information used by the second network node in reporting load information to the first network node; and a reporting module 52, which is configured to receive reported load information to the first network node according to the configuration information.

The second network node and the first network node belong to different logical nodes in a network.

In an embodiment, the first network node may be a network node in which the control plane is located, the second network node may be a network node in which the user plane is located, and the control plane and the user plane may be the control plane and the user plane of the same network element or the control plane and the user plane of the same system, or the control plane and the user plane of different objects.

It is to be noted that the various modules described above may be implemented by software or hardware. Implementation by hardware may, but may not necessarily, be performed in the following manners: the various modules described above are located in a same processor, or the various modules described above are located in different processors in any combination form.

The 5G user services required by the different quality of service (QoSs) and the unbalanced user service physical distribution have different requirements for network deployment and data transmission performance of the 5G network. These data services of different types are often interleaved, or exploded at a local hotspot area, so that the current relatively closed network architecture is unable to efficiently support various 5G scenarios. Therefore, on the basis of the classifications of the first element network and the second network element, the control plane (CP) and the user plane (UP) in the first network element need to be physically divided (it is noted: a CP function set and a UP function set have been divided logically, but are physically integrated into a single network element) by comprehensively considering from the transmission latency, load balancing, multi-manufacturer device interoperability and deployment cost at the same time, so that the CP and the UP are able to be deployed in different geographical positions, and may be configured independently, and resource expansion and function upgrading can be performed on the CP and UP independently, thereby more flexibly and efficiently satisfying requirements of various 5G services.

In a 5G network, when one CP is connected to multiple UPs at the same time, the traffic loads carried by respective UPs are different. When the traffic of a certain UP is overloaded, the CP needs to balance part of overloaded traffic of the UP to other UPs to achieve load balancing of the entire network. In addition, when a new UE accesses to the network, the CP needs to know a current load status of each UP and select a most appropriate UP for the UE. Therefore, the CP acquires the traffic load status from each UP to implement the load balancing of the entire network and fully exhibit the maximum performance of the network. The traffic load information here may include a hardware resource load status, an NG-U interface and a F1-U interface bandwidth occupation percentages, a network slice resource usage status, a physical resource block (PRB) usage status and so on.

Therefore, when the CP is connected to multiple UPs, the problem of how to acquire the traffic load status of each UP and coordinate the management needs to be solved as soon as possible to achieve load balancing and fully exhibit the maximum performance of the network.

Contents of an embodiment are applicable to the load information interaction problems related to the scenario of CP/UP network element physical separation in the 5G NR or other equivalent systems. The logical interface between CP/UP network element entities is called as an E1 interface.

A traffic load information interaction function of the E1 interface includes initialization and reporting. A traffic load information interaction initialization process includes the following E1 wireless access point (AP) messages: a traffic load information request message, a traffic load information response message; and a traffic load information reporting function includes the following E1 AP message: a traffic load information updating message.

The solution in an embodiment includes: traffic load information initialization and traffic load information reporting.

Traffic load information initialization:

the CP initiates a traffic load request message, which includes, but is not limited to, one or more of:

identification information of the CP, which may be a CP ID or IP address information;

identification information of a target UP, which may be a UP ID or the IP address information;

indication information of a reporting manner for a traffic load of the target UP, the reporting manner may include, but is not limited to, the following types: such as indicating to be a periodic reporting, an event-triggered reporting, or a real-time reporting; when indicating to be the periodic reporting, the indication information of the reporting manner further includes: a reporting period; when indicating to be the event-triggered reporting, the indication information of the reporting manner further includes information such as an event type and an event-related threshold and the like;

load reporting granularity information of the requested target UP, the reporting granularity may be of node-level, cell-level or UE-level; for example, the node-level load information includes: a UP hardware resource load status, a NG-U interface transmission bandwidth occupation percentage, an F1-U interface transmission bandwidth occupation percentage, etc; the cell-level load information includes: traffic information of all users in each cell currently supported by the UP, a resource usage status of each slice in each cell, the number and/or type(s) of DRBs currently established in each cell, and the number of active users in each cell; the UE-level load information includes: traffic information of a current user.

A load object of the requested target UP includes, but not limited to, one or more of:

the hardware resource load status;

the NG-U interface transmission bandwidth occupation percentage;

the F1-U interface transmission bandwidth occupation percentage;

resource usage information corresponding to each slice;

the number of DRBs currently established by the UP;

the number of active users of the UP; or user traffic information.

After receiving the traffic load request message, the UP sends the traffic load request response message to the CP according to the current traffic load information. The traffic load request response message includes, but is not limited to, one or more of:

identification information of the CP, which may be the CP ID or IP address information;

identification information of the UP, which may be the ID or the IP address information; or a list of measurement objects able to be supported by the UP in a measurement request, and a list of measurement objects unable to be measured currently.

If the UP is unable to initialize any traffic load information described above, the traffic load request failure message is sent by the UP to the CP, which includes, but is not limited to:

identification information of the CP, which may be the CP ID or IP address information;

identification information of the UP, which may be the ID or the IP address information; and a failure cause value.

Traffic Load Information Reporting:

The UP reports traffic load information according to the configuration information in the received traffic load initialization message, the traffic load information includes, but is not limited to:

identification information of the CP, which may be the CP ID or IP address information;

identification information of the UP, which may be the ID or the IP address information;

load reporting granularity information of the UP, the reporting granularity may be of node-level, cell-level or UE-level; for example, the node-level load information includes: a UP hardware resource load status, a NG-U interface transmission bandwidth occupation percentage, an F1-U interface transmission bandwidth occupation percentage, etc.; the cell-level load information includes: traffic information of all users in each cell currently supported by the UP, a resource usage status of each slice in each cell, the number and/or type(s) of data resource bearers (DRBs which are between the terminal and the base station) currently established in each cell, and the number of active users of each cell; the UE-level load information includes: traffic information of the current user.

Load object measurement reporting of the UP includes, but not limited to:

the hardware resource load status;

the NG-U interface transmission bandwidth occupation percentage;

the F1-U interface transmission bandwidth occupation percentage;

resource usage information corresponding to each slice;

the number of DRBs currently established by the UP;

the number of active users of the UP; or user traffic information.

The CP selects an appropriate UP for a newly accessed user to provide data transmission services according to the load information reported by the UPs, or user data on the current UP may be migrated to another UP with a light load, so the current UP may continuously provide services to the UE.

Figure 6:
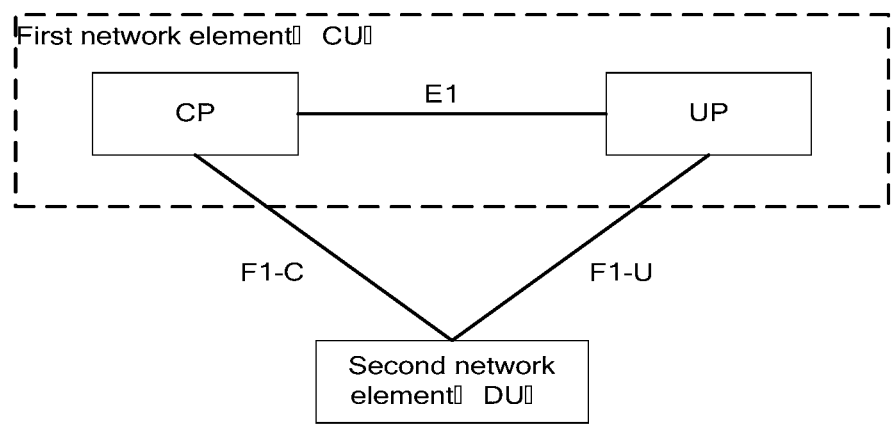
FIG. 6 is a schematic diagram of a relationship among a first network element (CP), a first network element (UP) and a second network element provided by an embodiment of the present disclosure.

FIG. 6 is a schematic diagram of a relationship among a CP of a first network element, a UP of the first network element and a second network element according to an embodiment of the present disclosure. The CP and UP are respectively located in two different CUs, implementing the separation of user plane data and control plane data. For ease of description, an interface between the first network element and the second network element is an F1AP interface, and the interface between the CP and the UP is an E1 interface.

Figure 7:
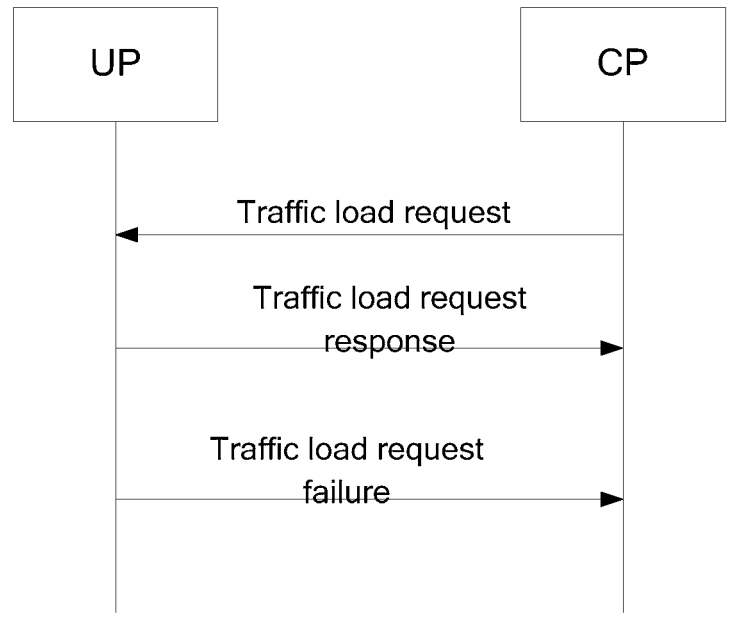
FIG. 7 is a schematic flowchart of initialization of a traffic load reporting initiated by a CP provided by an embodiment of the present disclosure.

An embodiment may further include the following:

FIG. 7 is a flowchart of initialization of a traffic load reporting initiated by a CP provided by an embodiment of the present disclosure.

A traffic load request message the direction is CP→UP.

The traffic load request message includes, but is not limited to:

identification information of the CP, which may be a CP ID or IP address information;

identification information of a target UP, which may be a UP ID or the IP address information;

indication information of a reporting manner for a traffic load of the target UP, the reporting manner may include, but are not limited to, the following types: such as indicating to be a periodic reporting, an event-triggered reporting, or a real-time reporting; when indicating to be the periodic reporting, the indication information of the reporting manner further includes: a reporting period; when indicating to be the event-triggered reporting, the indication information of the reporting manner further includes information such as an event type and an event-related threshold and the like;

load reporting granularity information of the requested target UP, the reporting granularity may be the node level, the cell level or the UE level; for example, the node level load information includes: a UP hardware resource load status, a NG-U interface transmission bandwidth occupation percentage, a F1-U interface transmission bandwidth occupation percentage, etc; the cell level load information includes: traffic information of all users in each cell currently supported by the UP, a resource usage status of each slice in each cell, the number and/or type of DRBs currently established in each cell, and the number of active users of each cell; the UE-level load information includes: traffic information of the current user.

A load object of the requested target UP includes, but not limited to, one or more of: the hardware resource load status;

the NG-U interface transmission bandwidth occupation percentage;

the F1-U interface transmission bandwidth occupation percentage;

resource usage information corresponding to each slice;

the number of DRBs currently established by the UP;

the number of active users of the UP; or user traffic information;

The traffic load request response message:

the direction is UP→CP.

The traffic load request response message includes, but is not limited to:

identification information of the CP, which may be the CP ID or IP address information;

identification information of the UP, which may be the ID or the IP address information;

a list of measurement objects able to be supported by the UP in a measurement request, and a list of measurement objects unable to be measured currently.

A traffic load request failure message:

the direction is UP→CP.

The traffic load request failure message includes, but is not limited to:

identification information of the CP, which may be the CP ID or IP address information;

identification information of the UP, which may be the ID or the IP address information; and a failure cause value.

Figure 8:
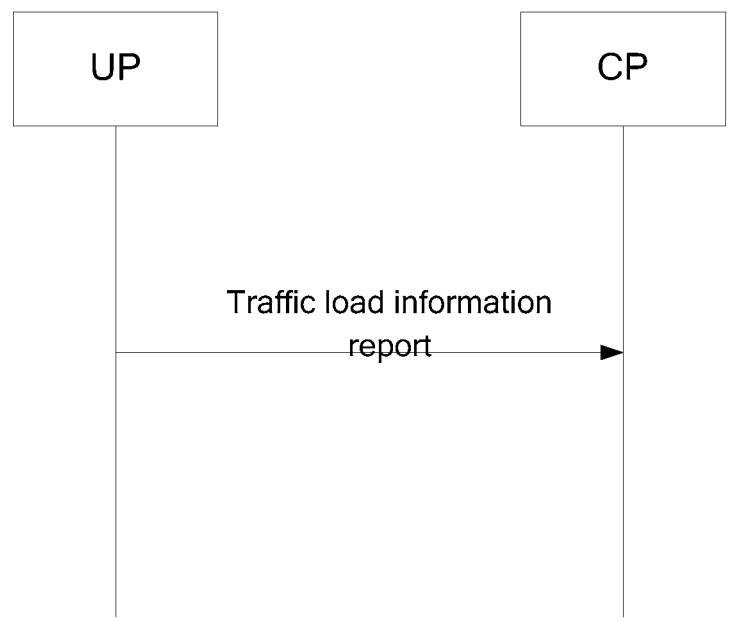
FIG. 8 is a schematic flowchart of a traffic load reporting provided by an embodiment of the present disclosure.

FIG. 8 is a schematic flowchart of a traffic load reporting provided by an embodiment of the present disclosure.

A traffic load information reporting message:

the direction is UP→CP.

The traffic load information reporting message includes, but is not limited to:

identification information of the CP, which may be the CP ID or IP address information;

identification information of the UP, which may be the ID or the IP address information;

load reporting granularity information of the UE, the reporting granularity may be of node-level, cell-level or UE-level; for example, the node-level load information includes: a UP hardware resource load status, a NG-U interface transmission bandwidth occupation percentage, an F1-U interface transmission bandwidth occupation percentage, etc; the cell-level load information includes: traffic information of all users in each cell currently supported by the UP, a resource usage status of each slice in each cell, the number and/or type(s) of DRBs currently established in each cell, and the number of active users of each cell; the UE-level load information includes: traffic information of the current user.

Load object measurement reporting of the UP includes, but not limited to:

the hardware resource load status;

the NG-U interface transmission bandwidth occupation percentage;

the F1-U interface transmission bandwidth occupation percentage;

resource usage information corresponding to each slice;

the number of DRBs currently established by the UP;

the number of active users of the UP; or user traffic information.

The CP selects an appropriate UP for a newly accessed user to provide data transmission services according to the load information reported by the UPs, or user data on the current UP may be migrated to another UP with a light load, so the current UP may continuously provide services to the UE.

An embodiment of the present disclosure further provides a storage medium which is configured to store program codes for executing the steps described below.

In S1, a load request message is sent to a second network node, where the load request message is used for indicating configuration information used by the second network node in reporting load information to the first network node.

In S2, the load information reported by the second network node is received according to the configuration information.

In an embodiment, the storage medium may include, but is not limited to, at least one of: a USB disk, an ROM, an RAM, a mobile hard disk, a magnetic disk, an optical disk or any medium capable of storing program codes.

In an embodiment, a processor performs, according to the program codes stored in the storage medium: sending a load request message to a second network node, where the load request message is used for indicating configuration information used by the second network node in reporting load information to the first network node; receiving the load information reported by the second network node according to the configuration information.

Apparently, it should be understood by those skilled in the art that each of the above-mentioned modules or steps of the present disclosure may be implemented by a general computing apparatus, the modules or steps may be concentrated on a single computing apparatus or distributed on a network composed of multiple computing apparatuses, and alternatively, the modules or steps may be implemented by program codes executable by the computing apparatus, so that the modules or steps may be stored in a storage apparatus and executed by the computing apparatus. In some circumstances, the illustrated or described steps may be executed in sequences different from those described herein, or the modules or steps may be made into various integrated circuit modules separately, or multiple modules or steps therein may be made into a single integrated circuit module for implementation. In this way, the present disclosure is not limited to any specific combination of hardware and software.

The above are only specific embodiments of the present disclosure and are not intended to limit the present invention. It is easy for those skilled in the art to conceive modifications or substitutions within the technical scope of the present invention. Any modifications, equivalent replacements, improvements and the like within the spirit and principle of the disclosure shall fall within the scope of protection of the disclosure.

What is claimed is:

1. A base station, comprising:
at least one processor configured to:
send, at a centralized unit (CU) of the base station, a load request message to a distributed unit (DU) of the base station, wherein the load request message is configured to make a request for the DU to report load information to the CU, and wherein the load request message indicates a load object of the load information to which the DU is requested to report; and
receive, at the CU from the DU, the load information;
wherein the DU and the CU belong to different logical nodes in a network;
wherein the load object includes resource usage information corresponding to each slice of a cell.

2. The base station of claim 1, wherein the load object includes at least one of: a hardware resource load status of the DU or a number of active users of the DU.

3. The base station of claim 1, wherein after sending the load request message, the at least one processor configured to receive, at the CU from the DU, a load request response message, wherein the load request response message indicates that the request is completed.

4. The base station of claim 3, wherein the load request response message includes a measurement identification (ID).

5. The base station of claim 1, wherein after sending the load request message, the at least one processor configured to receive, at the CU from the DU, a load request failure message, wherein the load request failure message indicates that the request fails.

6. The base station of claim 5, wherein the load request failure message includes at least one of: a measurement identification (ID), or a cause value for failure of the request.

7. The base station of claim 1, wherein the load information comprises a hardware resource load status of the DU.

8. The base station of claim 1, wherein the load information comprises at least one of the resource usage information corresponding to each slice of the cell, or a number of active users of the cell.

9. A base station, comprising:
at least one processor configured to:
receive, at a distributed unit (DU) of the base station, from a centralized unit (CU) of the base station, a load request message, wherein the load request message is configured to request the DU to report load information to the CU, and wherein the load request message indicates a load object of the load information to which the DU is requested to report; and
send, from the DU to the CU, the load information;
wherein the DU and the CU belong to different logical nodes in a network;
wherein the load object includes resource usage information corresponding to each slice of a cell.

10. The base station of claim 9, wherein the load object includes at least one of: a hardware resource load status of the DU or a number of active users of the DU.

11. The base station of claim 9, wherein after receiving the load request message, the at least one processor configured to send, at the DU to the CU, a load request response message, wherein the load request response message indicates that the request is completed.

12. The base station of claim 11, wherein the load request response message includes a measurement identification (ID).

13. The base station of claim 9, wherein after receiving the load request message, the at least one processor configured to send, at the DU to the CU, a load request failure message, wherein the load request failure message indicates that the request fails.

14. The base station of claim 13, wherein the load request failure message includes at least one of: a measurement identification (ID), or a cause value for failure of the request.

15. The base station of claim 9, wherein the load information comprises a hardware resource load status of the DU.

16. The base station of claim 9, wherein the load information comprises at least one of the resource usage information corresponding to each slice of a cell, or a number of active users of the cell.

* * * * *